March 25, 1969   R. V. MATHISON   3,434,577
CLUTCH DEVICES
Original Filed Dec. 13, 1965

*INVENTOR:*
ROBERT V. MATHISON
BY
*Marzall, Johnston, Cook & Root*
ATT'YS

United States Patent Office 3,434,577
Patented Mar. 25, 1969

3,434,577
CLUTCH DEVICES
Robert V. Mathison, 5 Woodcrest Road,
Asheville, N.C. 28804
Application Dec. 13, 1965, Ser. No. 513,400, now Patent
No. 3,386,122, dated June 4, 1968, which is a continuation-in-part of application Ser. No. 285,261, June 4, 1963, now Patent No. 3,261,069, dated July 19, 1966. Divided and this application May 9, 1968, Ser. No. 727,944
Int. Cl. F16d *11/00, 13/00, 23/00*
U.S. Cl. 192—46                          10 Claims

ABSTRACT OF THE DISCLOSURE

Rotatable devices with clutch face containing sloping projections adapted to penetrate and remain seated in porous, opposing clutch face and releasably grip same; uses thereof in opposed disc-face, disengageable clutches and in one-way drives.

Related application

This application is a division of my copending application Ser. No. 513,400, filed Dec. 13, 1965, now U.S. Patent No. 3,386,122, issued June 4, 1968, which in turn is a continuation-in-part of application Ser. No. 285,261, filed June 4, 1963, now U.S. Patent No. 3,261,069, issued July 19, 1966.

Brief description of invention

This invention, in general, relates to clutch and other rotatable drive members having a disc face with a plurality of small, tapered, outwardly sloping projections having relatively sharp tips, the axes of the respective projections extending substantially at right angles to respective radii through said projections from the center of the disc face and sloping at an acute angle, relative to the face, of about 15–60°. These projections are adapted to penetrate the pores or interstices in the surface of a porous member and remain tightly seated therein when the rotatable member is rotated with the projections orbiting in a direction whereby the undersides of said sloping projections are the leading sides.

The aforesaid rotatable members have many mechanical applications, e.g., as a component of a clutch or rotary drive coupling, e.g., as a driven or driving face of a clutch or drive coupling, in which the projections penetrate the interstices of a porous surface on the other face of the clutch or drive coupling and rotatably interlock the two faces when the projections orbit as aforesaid. The embodiments with cavity have shoulder means projecting from the disc-face beyond the tips of the projections, the shoulder means and face defining the cavity.

The embodiments of the projection-containing, rotatable member in clutches or rotary drive couplings use the member as the driven or driving disc face of the clutch or drive coupling. It coacts with another, opposing disc face on a second rotatable member. The latter is mounted for rotation about an axis of rotation substantially at the center of the opposing disc face and substantially aligned with the axis of rotation of the first-mentioned rotatable member. The opposing disc face has a surface of porous material, and the faces are held in face-to-face contact with the projections penetrating and seated in the interstices of the porous material.

The rotatable members and the respective faces may be held in the face-to-face contact by means for effecting relative movement of said members and faces toward and away from each other to engage and disengage the projections from the interstices of the porous material, thereby providing a clutch combination having a disengageable, unidirectional, rotary drive. Alternatively, the rotary drive coupling may be one wherein said means holding said faces in face-to-face contact maintains said contact at a contact pressure of said layer against said projections whereby the latter penetrate said interstices and grip said porous material when the driven member of said coupling is rotated in one direction and whereby said projections release from said interstices and slide over said porous material when said driven member is rotated in the opposite direction. This type of coupling may be used in a step-by-step, unidirectional, rotary drive mechanism by providing means operatively associated with the driven member of the coupling for oscillating said member.

It is the primary object of this invention to provide projection-containing, rotatable members having the structural and functional features aforedescribed in clutches or other rotary drive couplings and the like mechanical applications.

The aforesaid projections may be tapered pins of metal or like material mounted in or on the disc face, or they may be cast or molded integrally therewith or struck out therefrom. Preferably, however, the projections are made of synthetic thermoplastic polymer and are molded or cast integrally with a plastic disc face or with small, plastic plates, which in turn are mounted on the disc face. The projections may be arranged on the face in a variety of ways, e.g., in radial rows, in one or more circles, or on plates arranged in radial rows or one or more circles.

Description of drawings

The foregoing and numerous other important objects, features and inherent functions of the invention will be apparent as the same is more fully understood from the following description, which, taken in connection with the accompanying drawings, discloses preferred embodiments of the invention.

In the drawings.

Description of preferred embodiments

Figure 1:
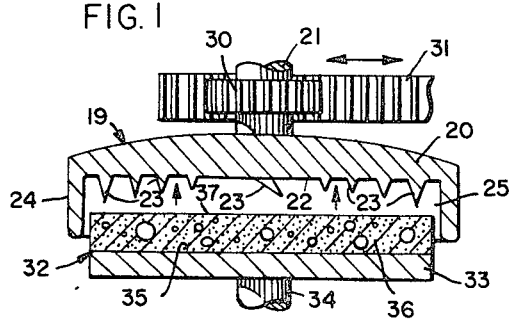
FIG. 1 is an exploded view in diametric cross-section of a rotary drive coupling with an oscillating drive for the driven member.

Referring to the drawings, the embodiment of FIG. 1 shows the use of the rotatable member 19 as a component of a step-by-step, intermittent, unidirectional rotary drive. The rotatable member 19 has a disc 20 attached to and rotatably driven by the drive shaft 21. The disc face 22, as illustrated, is planar, but it may be concave or convex, if desired. The small, tapered, sloping projections 23 are arranged in radial rows. The slope of the projections 23 relative to face 22 can be seen from the centermost projection, which is seen in side elevation. The other projections, when viewed in side elevation, look the same.

An annular rib or shoulder 24 projects forwardly of face 22 a distance well beyond the tips of projections 23 and defines with face 22 a cavity 25. The wall defining shoulder 24 may be a cylindrical wall as shown, or it may be a series of spaced, short wall segments, pins, rods, etc., arranged in the desired shape, e.g., a circle.

The rotatable member 19 is oscillated by a suitable mechanical drive, e.g., a pinion 30 on shaft 21 and a reciprocating rack 31 driving the pinion. The driven element 32 comprises a disc or plate 33 rotatably supported by shaft 34 for rotation about an axis coaxial with the axis of rotation of the drive member 19. The face 35 of disc or plate 33, which faces the projection-containing face 22, has affixed thereon a layer 36 of porous material having interstices adapted to be penetrated by and gripped upon projections 23. The layer 36 may be fabric which is woven, knitted or a loop pile. Preferably it is the latter or a cellular elastomer for reasons hereinafter set forth.

The face 37 of layer 36 is brought into light contact with face 22 and projections 23, the latter in this illustrated case having progressively longer lengths in each radial row from the center outwardly. Uniform length projections may be used, if desired.

Under the aforesaid light contact, the projections 23 bite into the interstices of porous surface 37 when they are orbited with their undersides in the lead. This interlocks the driving member 19 with the driven member 32 so that the later and its shaft turn. When projections 23 are orbited in the opposite direction, projections 23 release from the interstices and slide over the surface 37 by virtue of the light contact of surface 37 with the projections 23. The surface 37 preferably is one which will deform resiliently so that projections 37 do not wear the surface unduly as they slide thereover. Loop pile of the type used in carpeting or cellular elastomers are particularly suitable.

The mechanism of FIG. 1, therefore, provides a step-by-step, unidirectional, rotary drive of the member 32. As viewed in FIG. 1, the rotary drive of member 32 is activated when rack 31 moves to the right and is deactivated when rack 31 moves to the left.

Figure 2:
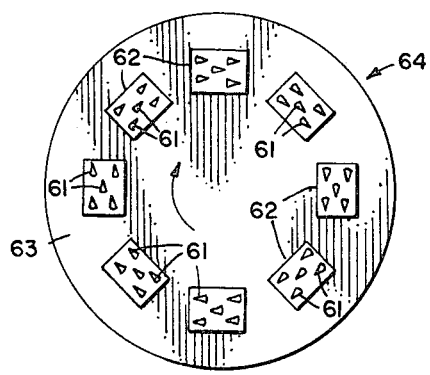
FIG. 2 is a plan view of a disc embodiment with projection-containing plates mounted on a disc face.

The embodiment of FIG. 2 is a disc which can be used in any embodiment of the invention. In the other illustrated embodiments, the projections are molded integral with or mounted individually on the projection-containing member. In FIG. 2, the projections 61 are formed in groups on respective plates or bases 62. The plates or bases with the small, tapered, sloping projections thereon preferably are integrally molded from synthetic thermoplastic polymers and may be made in accordance with the disclosure of my U.S. Patent No. 3,214,816, issued Nov. 2, 1965, the disclosure of which is incorporated herein by reference. The projections 61 on each plate 62 all slope in substantially the same direction, and the plates 62 are mounted in any suitable manner, e.g., by adhesive, in one or more circles on the face 63 of disc 64 so that the projections all slope in substantially the same circular or circumferential direction.

Figure 3:
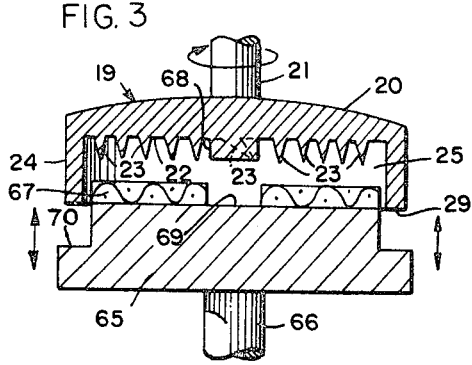
FIG. 3 is an exploded view in diametric cross-section of a disengageable clutch of the invention.

The embodiment of FIG. 3 is a disengageable clutch employing as the driving (or driven) member the previously described rotatable member 19. The other component of the clutch comprises a rigid disc 65 rotatably mounted by shaft 66 for rotation about an axis substantially coaxial with the axis of rotation of shaft 21. The clutch face has a fabric facing ring 67 which is brought into engagement with projections 23. The latter penetrate the interstices of the fabric facing 67 and thereby interlock members 19 and 65 for rotation together in the arrow direction. The clutch members are moved toward and away from each other in the arrow directions by any conventional mechanism (not shown). The depth to which disc 65 and its facing ring 67 enter cavity 25 may be limited by providing a stub shaft 68 at the center of face 22, which stub shaft contacts the center portion 69 of disc 65, and/or by providing on disc 65 an annular shoulder 70 which contacts the edge 29 of the shoulder 24. The clutch combination provides a positive, non-slip interlock of the rotatable clutch elements 19 and 65 when the sloping projections 23 are orbiting with their shortest sides (the undersides) as the lead sides.

In the preferred forms, the aforesaid projections are smooth-sided, substantially rigid, closely spaced projections which taper from their bases to relatively sharp tips. They preferably are substantially conical or pyramidal, slightly blunted if desired, and have a center-to-center spacing at their tips in the order of 0.03 to 0.25 per inch. The size of the bases of the projections is preferably at least 0.03 inch in one direction. The vertical heights of the tips from the surface from which they emanate preferably is in the range of 0.03 to 0.15 inch. The intensity of the projections, when arranged in close rows as on plates or bases 62, is preferably in the range of 100 to 500 projections per square inch of the surface actually covered by the projections.

Small, closely-spaced projections in relatively large numbers are particularly advantageous for the uses herein. They easily penetrate, seat in, exit from, and slide over, as the case may be, the woven, knitted, loop pile, and like fabrics or other porous members such as cellular elastomers with minimum damage to the fabric or other porous members.

The size and arrangement of the projections will vary to some extent depending upon the intended use but in most cases it is preferably that the projections be integrally formed or molded on a supporting sheet at an axis angle of 45 to 60°, that the adjacent projections be separated from each other center-to-center by a distance of from 0.060 to 0.150 inch, and that the vertical height from the tips of the projections to the surface of the supporting member be from 0.060 to 0.150 inch.

The synthetic polymer from which the projection containing member is formed can be a homo-polymer, such as a polymer of formaldehyde (e.g., Delrin), or a polymer of tetarfluoroethylene (e.g., Teflon), or polyethylene or polypropylene, or a copolymer (e.g., nylon). These polymers can also be described as synthetic resins.

All the rotatable member embodiments with the disc face and the projections thereon may be characterized broadly as a plurality of small, tapered, sloping projections having relatively sharp tips and projecting from said face of said disc, the axes of the respective projections extending substantially at right angles to respective radii through said projections from said center and sloping at an acute angle relative to said face of about 15–60°, the undersides of said sloping projections also sloping at an acute angle relative to said face of about 20–70°, and said projections adapted to penetrate the interstices of a porous member and remain tightly seated therein when said rotatable member is rotated with said projections orbiting with the undersides of said sloping projections being the leading sides.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

1. A rotatable drive coupling comprising a rotatable member having a disc face, a shaft connected to said member for rotation of said member about an axis of rotation substantially at the center of said disc face, a plurality of small, tapered, sloping projections having relatively sharp tips and projecting from said face of said disc, the axes of the respective projections extending substantially at right angles to respective radii through said projections from said center and sloping at an acute angle relative to said face of about 15–60°, the undersides of said sloping projections also sloping at an acute angle relative to said face of about 20–70°, and said projections adapted to penetrate the interstices of a porous member and remain tightly seated therein when said rotatable member is rotated with said projections orbiting with the undersides of said sloping projections being the leading sides, said face forming one of the faces of said coupling, a sceond rotatable member having an opposing disc face, means mounting said second member for rotation about an axis of rotation substantially at the center of said last mentioned disc face and substantially aligned with said first mentioned axis of rotation, a surface of porous material on said last mentioned disc face and forming the other face of said coupling, and means holding said faces in face-to-face contact with said projections penetrating and seated in the interstices of said porous material.

2. A coupling as claimed in claim 1, wherein said means holding said faces in face-to-face contact includes means for effecting relative movement of said rotatable members and the respective faces thereof toward and away from each other to engage and disengage said coupling, thereby providing a clutch having a disengageable, unidirectional, rotary drive.

3. A coupling as claimed in claim 1 wherein said means holding said faces in face-to-face contact maintains said contact at a contact pressure of said layer against said projections whereby the latter penetrate said interstices and grip said porous material when the driven member of said coupling is rotated in one direction and whereby said projections release from said interstices and slide over said porous material when said driven member is rotated in the opposite direction.

4. A coupling as claimed in claim 3, and means operatively associated with the driven member of said coupling for oscillating said driven member, whereby said coupling provides a step-by-step, unidirectional rotary drive mechanism.

5. A coupling as claimed in claim 4 wherein said porous material is a loop pile fabric.

6. A coupling as claimed in claim 3 wherein said porous material is a loop pile fabric.

7. A coupling as claimed in claim 1 wherein said porous material is a loop pile fabric.

8. A coupling as claimed in claim 4 wherein said porous material is a cellular elastomer.

9. A coupling as claimed in claim 3 wherein said porous material is a cellular elastomer.

10. A coupling as claimed in claim 1 wherein said porous material is a cellular elastomer.

References Cited

UNITED STATES PATENTS

| | | | |
|---|---|---|---|
| 154,189 | 8/1874 | Race | 192—41 |
| 2,690,246 | 9/1954 | Kelleigh | 192—66 |
| 3,143,895 | 8/1964 | Robie. | |
| 3,386,122 | 6/1968 | Mathison | 192—46 XR |

CARLTON R. CROYLE, *Primary Examiner.*

ALLAN D. HERRMANN, *Assistant Examiner.*

U.S. Cl. X.R.

192—67, 107